No. 830,109. PATENTED SEPT. 4, 1906.
T. S. SMITH.
MAIL CARRIER.
APPLICATION FILED JUNE 28, 1905.

WITNESSES:
W. O. Monck
F. Gimbel.

INVENTOR
Thaddeus S. Smith
BY
Thompson & Bell,
ATTORNEY

No. 830,109. PATENTED SEPT. 4, 1906.
T. S. SMITH.
MAIL CARRIER.
APPLICATION FILED JUNE 28, 1905.

WITNESSES:
W⁻ O. Monk
J. Gimbel

INVENTOR
Thaddeus S. Smith
BY
Thompson & Bee
ATTORNEY

No. 830,109. PATENTED SEPT. 4, 1906.
T. S. SMITH.
MAIL CARRIER.
APPLICATION FILED JUNE 28, 1905.

WITNESSES:
Wm O. Morek
F. Gimbel.

INVENTOR
Thaddeus Smith
BY
Thompson R. Peel
ATTORNEY

No. 830,109. PATENTED SEPT. 4, 1906.
T. S. SMITH.
MAIL CARRIER.
APPLICATION FILED JUNE 28, 1905.

WITNESSES:
Wm. O. Monk
F. Gimbel

INVENTOR
Thaddeus S. Smith
BY
Thompson & Bell
ATTORNEY

No. 830,109. PATENTED SEPT. 4, 1906.
T. S. SMITH.
MAIL CARRIER.
APPLICATION FILED JUNE 28, 1905.

WITNESSES:
Wm O. Monk
F. Gimbel

INVENTOR
Thaddeus S. Smith
BY
Thompson & Bell
ATTORNEY

UNITED STATES PATENT OFFICE.

THADDEUS S. SMITH, OF INDIANAPOLIS, INDIANA, ASSIGNOR OF ONE-HALF TO FRANK W. FLANNER, OF INDIANAPOLIS, INDIANA.

MAIL-CARRIER.

No. 830,109.     Specification of Letters Patent.     Patented Sept. 4, 1906.

Application filed June 28, 1905. Serial No. 267,419.

*To all whom it may concern:*

Be it known that I, THADDEUS S. SMITH, a citizen of the United States, residing at Indianapolis, in the county of Marion and State of Indiana, have invented certain new and useful Improvements in Mail-Carriers, of which the following is a specification, reference being had therein to the accompanying drawings.

This invention relates to an electrically-propelled carriage or vehicle for conveying mail, delivering it to and collecting it from various stations intermediate the terminals of the route, as will be hereinafter more particularly described, and pointed out in the claims.

The chief object of this invention is to provide a means whereby the mail of an entire rural route will be conveyed from a terminal station and delivered at the various intermediate stations or any station between the terminals in their order and on returning the empty mail-sacks or sacks containing mail will be collected and return the same to the original terminal or starting place or station. I attain these objects by means of the electrically-propelled mail carriage or vehicle and the mail delivering and receiving mechanism illustrated in the accompanying drawings, in which similar numerals of reference designate like parts throughout the several views.

Fig. 34 is a detail sectional view of the rear turn-table, showing the pivotal center thereof provided with a central bore or way, through which the conducting-wires of the motor pass.

The mail carriage or vehicle comprises a mail-sack magazine-compartment 1, in which the mail-sacks are suspended in the order in which they are to be delivered, and the motor-compartment 2, wherein the electric motor 3 is firmly and permanently secured, which motor propels the carriage or vehicle continuously from terminal to terminal.

On the armature-shaft 4 of the motor 3 is secured the drive-pinion 5, which meshes with the gear-wheel 6, secured on the vertical shaft 7. The vertical shaft 7 extends through the journal or pivotal boss 8, formed centrally on the bottom side of the pivotally-connected table 9, and is journaled therein, said shaft being journaled at its bottom end in the journal 13, formed centrally in the top wall of the motor-chamber 2. The boss of the table 9 is journaled or pivoted in the boss 10, formed integral on the cover or casing 11, wherein the drive-gear of the vehicle is inclosed. On the top projecting end of said shaft 7 is secured the bevel gear-pinion 14, meshing with the bevel gear-wheel 15, which latter is secured on the axle 16. The axle 16 is journaled in the journals 17, secured on diametrically opposite sides of the pivotally-connected table 9, and said pivotal table 9 is connected to said cover or casing 11 by the retaining-screws 12, which also serve the purpose of stops to limit the swing of said table.

On the ends of the axle 16 at the proper distances apart or gage are secured the truck-wheels 18, which are grooved and provided with peripheral inside faced flanges 19 for the purpose of preventing the trolleys climbing the rails or wires 20 and 21, as shown particularly in Figs. 2, 4, 5, and 28, to run on the supporting wires or rails 20 and 21, thus supporting the motor end of the vehicle.

The mail receiving and delivering end of the vehicle or carriage is provided with the removable cover 22, which is provided with the side bars 23, which latter extend downwardly to embrace the sides of the compartment 1 and are bolted to said sides of said mail-sack magazine-compartment 1, by which means said cover 22 is firmly secured to the carriage.

The rear pivotal table 24 is similar in construction to that of the forward pivotal table 9. The table 24 is provided with a boss $24^a$, (see Fig. 34,) which is mounted in the boss $25^a$, formed integral on the projecting end 25 of the cover 22, and said boss $24^a$ is retained in position in said boss $25^a$ by the collar $24^b$. A retaining-bolt $24^c$ passes through the slot $24^d$, formed concentrically with the pivotal axis of the table 24, and is screwed or otherwise secured to the cover 22. The swing of the table 24 is therefore limited by the length of its retaining-slot $24^d$. On said table 24 are secured the standard-journals 26, wherein the axle 27 is journaled. On the ends of said axle 27 are secured the grooved truck-wheels 28.

The rails 20 and 21 serve the purpose of conducting-wires and are fed by a suitable electric machine situated at either terminal station. Suitable brushes 29 and 30 contact with the truck-wheels 28, which truck-wheels are adapted to run upon the conducting-wires 20 to support the front end of the carriage 1, and said brushes are connected by conducting-wires 31 and 32 to the motor 3 to operate the latter. The truck-wheels 18 and 28 are suitably secured on both of their axles 16 and 27 to secure perfect insulation between the opposite wheels 18 on the axle 16 and the wheels 28 on their axle 27.

A bevel-pinion 33 is also secured on the shaft 7 and meshes with the bevel-gear 34, secured on the end of the magazine screw-shaft 35, which shaft extends longitudinally and centrally along the top of the carriage and is journaled in the bore of the sleeve 40, which sleeve is journaled in and is supported by the standard 36, the sleeve 58, and the bearing 37 at one end and at its opposite end in the end journal $37^a$ and the intermediate journal $37^b$, formed integral on the end of the inclosing casing 38, which latter incloses the feed or magazine screw 39. The feed or magazine screw 39 may be either secured on the shaft 35 to turn therewith or it may be formed integral thereon.

The magazine screw-shaft 35 is arranged to revolve intermittently and is also designed to make only one single revolution at a time, which condition is accomplished by means of a trip-and-clutch mechanism which I now proceed to describe.

The bevel-gear 34 is secured on the end of the sleeve 40, on which is either formed integral or secured thereon, as by a key, the female clutch 41. The sleeve 42 is secured on the shaft 35 by a key 43 to turn therewith and to slide longitudinally thereon, (see detail Fig. 24,) and on the end of said sleeve is formed the male clutch 44, which is adapted to engage the female clutch 41. On the sleeve 42 is secured a shifting disk 45, in position thereon to be engaged by either of the double opposing arms or cams 48 or 49.

An arbor 46 is journaled in the boss 47, formed integral on the cover 11, and on the bottom end of said arbor are secured the double or opposing arms or cams 48 and 49, which latter are formed in one integral piece and are adapted to engage the disk 45, previously described, to move the male clutch 44 into engagement with the clutch 41 when the trip-lever 50 engages the trip-pin 51, secured in the cross-beam 52, which latter is supported on the ends of the supporting-columns 53.

A clutch-tooth-receiving notch or recess 54 is formed in the face of the sleeve 42, and the same is adapted to receive or to engage the tooth 55, formed on and projecting from the end face of the retaining or locking sleeve 58.

The sleeve 58 is bored to receive the shaft 35 and form a journal-bearing therefor, and said sleeve is supported in the bearing 59, wherein it is adapted to slide a limited distance and is prevented from turning therein by the key 60, formed integral on said sleeve and fitted in the keyway 61, formed in the bearing 59.

The lever 50 when engaged by the trip-pin 51, no matter what the direction of motion of the carriage may be, whether in a forwardly or in a backwardly direction, will cause the clutches 44 and 41 to engage to operate the magazine screw-shaft 35. Immediately the lever 50 is tripped to move the clutch 44 into engagement with its clutch 41 the notch 54 is brought out of engagement with the clutch-tooth 55, and the trued end 56 of the clutch-sleeve 42 engages the end of the tooth 55 to retain the clutch 44 in engagement with the clutch 41, and there being only a single notch 54 to receive the tooth 55 said shaft, together with its sleeve 42, will make only one revolution at a time, and at the end of each revolution the tooth 55 will be engaged by the notch 54 of the sleeve 42. In other words, the shaft 35 and its sleeve 42 will revolve until the notch 54 comes directly opposite the tooth 55, at which position the said sleeve will slide longitudinally till said tooth 55 is engaged by said sleeve-notch 54. The trip-lever 50 being released and the parts positively connected thereto permit the sleeve 42 and its clutch 45 to move backwardly into its former position, thereby releasing the clutches 44 and 41.

The return movement of the sleeve 42 into its position while at rest, together with its clutch 44, is accomplished by the coil-spring 57, surrounding the shaft 35 and situated between the clutches 44 and 41.

It will be readily understood from the foregoing that it is impossible for the shaft 35 to make more than one single rotation for each time the trip-lever 50 is tripped by its trip-pin 51.

When it is desirable to revolve the screw-shaft 35 manually to introduce the mail-sacks into the ways 82 to traverse them along said ways into their respective positions within the magazine-compartment 1, said shaft must be released by disengaging the clutch-sleeve 42 from the retaining-sleeve 58. It is obvious that the screw-shaft 35 cannot be revolved without revolving its driving mechanism or motor when the clutches 44 and 41 are engaged, and when said clutches are disengaged said shaft cannot be revolved, for the reason that the notch 54 immediately becomes engaged with the tooth 55, formed integral on the sleeve 58.

The mechanism whereby the sleeve 58 is disengaged I will now proceed to describe. A clutch-jaw 62, provided with the engaging pins 63, which latter engage the groove or recess 64, formed in the periphery of said sleeve 58, is secured on the arbor 65, which latter is journaled in the boss 66, formed integral on the cover 11. A lever-handle 67 is secured on the top projecting end of the arbor 65, and by means of the latter the sleeve 58 is traversed in its bearing 59 to disengage the tooth 55 from the notch 54 of the sleeve 42 to release the latter and also the shaft 35, thereby permitting said shaft to be revolved by hand when the carriage is not in operation to charge the magazine with the required number of mail-sacks. A stop-pin or lever-retaining pin 68 is provided for the purpose of locking said hand-lever and the mechanism connected thereto in either of its extreme positions. In other words, said pin locks said lever in position to prevent a longitudinal movement of the non-revoluble sleeve 58. The shaft 35 therefore cannot be revolved except when the clutches 41 and 44 are engaged, and then by means of the motor only, and when the sleeve 58 is moved to disengage the clutch-tooth 55 with the notch 54 of the clutch-sleeve 42, as will be better understood from the following: On the projecting end of the shaft 35, situated at the mail-sack-receiving end or magazine end of the carriage, is secured the miter-gear 69, which meshes with the miter-gear 70 of the same number of teeth, secured on the crank-shaft 71. The crank-shaft 71 is journaled in suitable bearings 72 and 73, and on the opposite end of said shaft is secured the crank 74. A connecting-rod 75 connects the crank 74 with the shorter arm 76 of the mail-sack-delivering lever 77, which latter is pivoted in the fulcrum pivotal pin 77$^a$, so it will be readily understood that the delivering-lever 77 will make one double swing or stroke in one direction and return in normal position for each revolution of the magazine screw-shaft 35.

The mail-sack conductor or chute comprises the outwardly-flaring sides or walls 78 and the supporting-ledges 79, upon which the T-head 80 of the mail-sacks rest in position to be either discharged from the carriage or to be moved into and along the curved ways 81 into position to be taken up by the magazine-screw 39 and traversed along the ways 82, from which said mail-sacks are suspended within the magazine portion of the carriage under cover.

The mail-sack-delivering lever 77 is provided with the pulling dog or catch 83 and the pushing-dog 84, both of which dogs are pivotally connected to the end of the inwardly and under bend 85 of the delivering-lever 77 by the pin 86.

Figure 15:
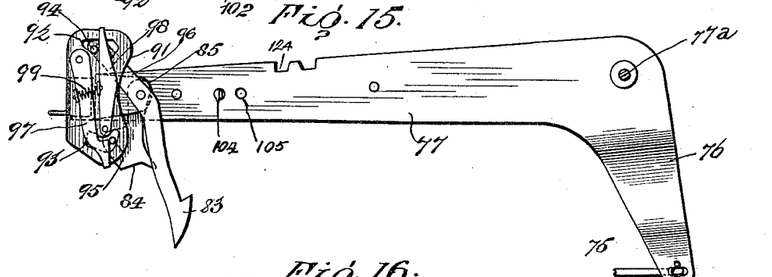
Fig. 15 is an inverted plan view of the same.

A cam-supporting arm 87 is formed integral on its leg 88, slidably secured to the lever 77 by the pins 89, which fit in and pass through the slots 90, to be secured to the lever 77, and said arm 87 and its leg are limited in their movement by the slots 90. A cam-plate 91 is formed integral with the arm 87 and extends under the bend 85, and the same is provided with the cam-openings 92 and 93, which engage the pins 94 and 95, secured on the lower sides of the arm 96 of the dog 83 and the end of the dog 84 to project downwardly therefrom, and said cams and dog-pins are provided for the purpose of yieldingly retaining said dogs 83 and 84 in their relative positions corresponding with the position of their cam-plate 91. To the under side of the cam-plate 91 are pivoted the retaining-levers 97 and 98, which are caused to bear against the dog-pins 94 and 95 to yieldingly maintain the latter in contact with the bearing sides of the cam-openings 92 and 93 to maintain said dogs in their relative positions by the coil-spring 99. (See particularly Figs. 15 and 18.)

Figures 16, 17, 18, 19, 20:
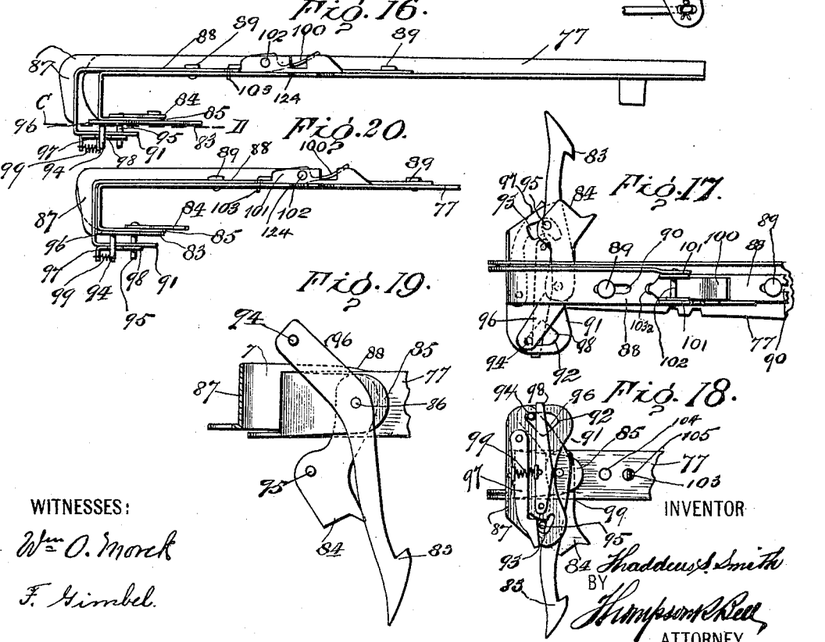
Fig. 16 is a side elevational view of said lever, showing the mail-sack mechanism and sliding arm thereof in the position illustrated in Figs. 14, 15, and 19.
Fig. 17 is a broken end portion of said lever, showing the mechanism thereof arranged and set to push the sacks into the magazine.
Fig. 18 is an inverted plan view of the same.
Fig. 19 is an enlarged detail sectional broken end portion of said lever, taken through the line C D, (see Fig. 16,) showing the mail-sack pushing and pulling dogs or catches with the spring-lever mechanism removed.
Fig. 20 is a broken side elevation of the said lever, showing the mail-sack-engaging mechanism and sliding arm thereof in the position illustrated in Figs. 17 and 18.

In order to lock the shifting leg 88 in either its outer, as shown in Figs. 14, 15, 16, and 19, or its inner position, as shown in Figs. 17, 18, and 20, I provide the spring locking-latch 100, which is situated between and pivoted to the upwardly-extending flanges 101 by the latch-pin 102. Said spring-latch, provided with a catch 103, which projects downwardly through a suitable opening 103$^a$, is adapted to engage either of the eyes 104 and 105, according to the position of the leg 88 to lock said leg and the mechanism attached thereto in either of the positions shown, particularly in Figs. 16 and 20 and Figs. 21 and 22.

Figures 21, 23:
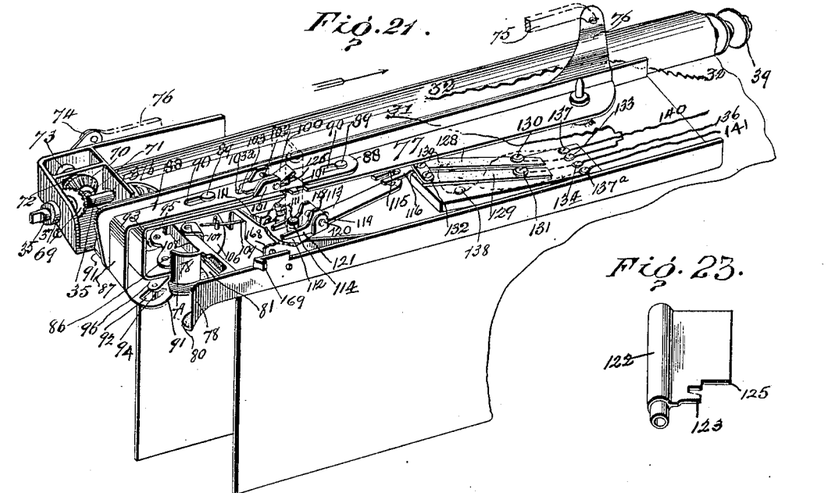
Fig. 21 is a broken perspective view of the rear end of the magazine or end portion of the carriage, showing the position of the electric switch for a forward motion of the carriage.
Fig. 23 is a detail perspective view of the key, whereby the switch and the dog mechanism of the swinging lever are simultaneously operated or set in their respective positions for either a forward or a backward motion.

I provide a retaining-cam 106, the arm of which is pivoted on the pin 107, secured on the conducting cover and guard 108 of the guideways 81, and said cam is preferably made segmental in form, so that when moved into the position shown in Fig. 21 the T-head 80 of a mail-sack cannot work out of position to be discharged from the ledges 79 of the receiving and discharging chute and move inwardly along the ways 81. Also when in the position shown in Fig. 22 said T-head of the mail-sack will be retained in position at the end of the ways 82 to be taken up by the magazine-screw 39. The respective positions of the retaining-cam 106 are entirely controlled and maintained by the spring or yielding bar 109, which has its one end adapted to be engaged by the cam-pins 110 and its opposite end secured in the lugs 111, secured or formed integral in the side of the shorter arm 112 of the switch-lever 113. The cam it will therefore be readily understood is moved into its position relatively to the position of said switch-lever simultaneously with the movement of the latter.

The switch-lever 113 is pivoted on the pin 114, secured on the top or roof of the magazine-compartment 1, and on the end of said lever is the upwardly-projecting switch-pin 115, which latter projects through the fork end 116 of the arm 128 of the pole-changer to move the latter simultaneously with the movement of the lever 113.

A spring-latch 118 is similar in construction to the latch 100 of the lever 77 and is situated on the lever 113 to be directly underneath said latter latch 100 when the lever 77 is in the position shown particularly in the Figs. 21 and 22, for the reason hereinafter set forth. The spring-latch 118 is situated between and pivoted to the lugs 119 of the switch-lever 113 by a pin 120, and said latch has its rearwardly upwardly extending arms or bifurcations 121 arranged to extend on opposite sides of and beyond the pivotal pin 114. The said latch is provided with a catch 121$^a$, (see Fig. 11,) which is adapted to engage the eyes or catch-openings 121$^b$ and 121$^c$ to retain said switch-lever 113 and the pole-changer connected thereto in either of the positions shown in Figs. 21 and 22.

Figure 22:
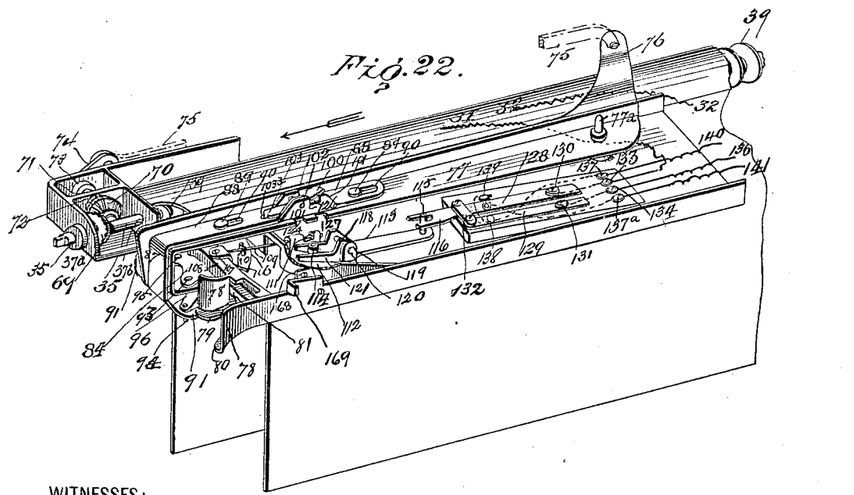
Fig. 22 is a similar view showing said switch in position for a backward motion of said carriage.
Figures 24, 25, 26, 27, 28:
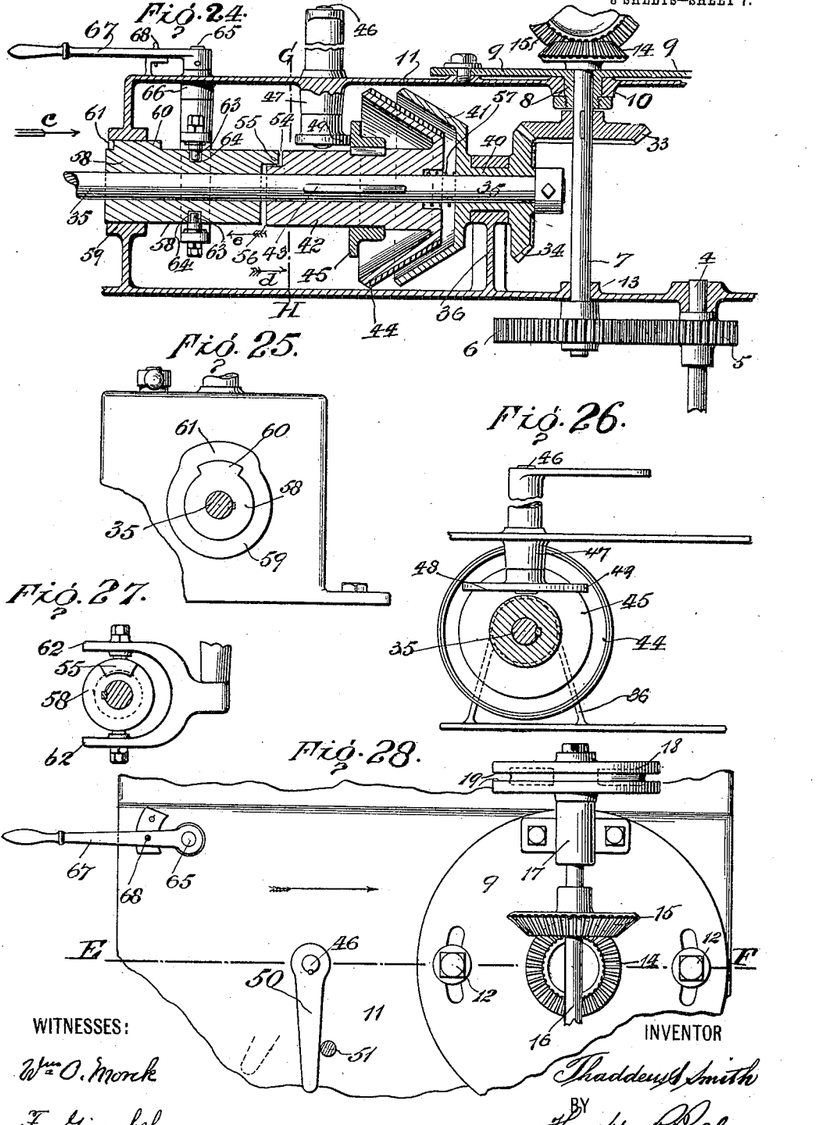
Fig. 24 is a longitudinal sectional view of the clutch mechanism, taken through the line E F, (see Fig. 28,) and its inclosing casing, which mechanism intermittently operates the magazine-screw and the mechanism connected thereto.
Fig. 25 is a broken end elevation of the same locking in the direction of the arrow c. (See Fig. 24.)
Fig. 26 is a transverse section taken through the line G H (see Fig. 24) and looking in the direction of the arrow d.
Fig. 27 is a detail sectional end view of the clutch-retaining sleeve and its fork looking in the direction of the arrow e. (See Fig. 24.)
Fig. 28 is a broken enlarged plan view of the front portion of the vehicle or carriage.
Figure 29:
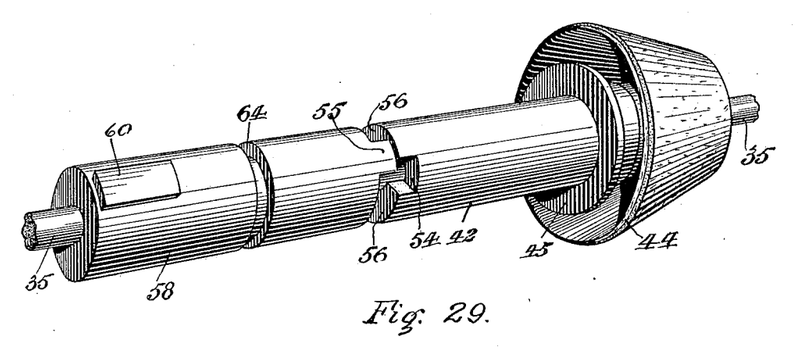
Fig. 29 is an enlarged perspective view of the clutch mechanism and its retaining-sleeve.

In order to change the position of the pole-changer from that shown in Fig. 21 to that shown in Fig. 22, it is also necessary to change the position of the shifting leg 88 simultaneously with it. To accomplish this, I provide the shifting key 122, which is applied to the switch-lever pivotal pin 114, so that the ward 123 enters the notch 124 to bear upon the arms 121 of the latch 118 to raise the catch 121$^a$ of said latch to be disengaged from its eye 121$^b$ at the same time the ward 125 enters the notch 126, formed in the lugs 101, and bears upon the end of the latch 100 to raise the catch 103 out of engagement. Both the lever 113 and the shifting leg 88 are then released to be moved simultaneously. This is accomplished by revolving the key 122 to the right, at the same time applying pressure to the key to firmly maintain the latch 100 and the latch 118 out of engagement till said shifting leg and said switch-lever have been moved into the position indicated in Fig. 11 and 22. The ward 123 of the key 122 is maintained in the space or notch between the two parts of the spring-carrying lug 111, thereby causing the switch-lever 113 to revolve when the key is revolved.

The cam 106, being connected by the yielding bar 109 to the shorter arm 112 of the switch-lever 113, will also be moved into its position relatively to the new position of said switch-lever 113 and the shifting leg 88 will move simultaneously with the movement of these latter to correspond with the relative positions of each. With this simultaneous movement of the shifting leg 88, the switch-lever 113, and the cam 106, the pole-changer is also moved to reverse the poles of the conductors connected to the motor to drive the carriage in the direction indicated by the arrow in Fig. 2—that is, a backwardly direction—and opposed to the forward direction indicated by the arrow in Fig. 21.

When it is desired to move the switch-lever 113 and the shifting leg 88 from the position shown in Fig. 22 to that shown in Fig. 21, the reverse operation by means of the key when applied as before is required—that is to say, the key 122 is applied to the pivotal pin 114, so that its ward 123 passes through the notch 127 of the lever 77 and the key is turned in the reverse direction. This returns the entire mechanism regulated by the key 122 to the position indicated in Fig. 21.

The pole-changer comprises the arms 128 and 129, which are pivoted at or near one of their ends on the terminal posts 130 and 131 and at their opposite ends are connected by an insulated bar 132, so as to maintain the parallelism and the distance apart of said arms in whatever position they may be moved over or between the terminals. The terminals 130 and 131 are connected to the posts 133 and 134 by suitable insulated wires, and to these posts are connected the wire 31, leading to the positive pole of the trolley-brush, and the wire 136, leading to the winding of the magnet of the motor. The post 137 is connected to the outer terminals 138 and 139, thereby forming a complete circuit between the terminal 139 and the post 137. The wire 140 connected to the post 137 connects at its opposite end to the commutator, as also does the wire 141. The wire 141 is connected to the post 137$^a$, and said post 137$^a$ is connected to the intermediate terminal 142 by a suitably-insulated wire. The poles of each of the wires connected to the pole-changer alternate positive and negative, according to the position of the pole-changer arms 128 and 129. The wire 32 connects with the negative trolley-brush at one end and at its other end to the magnet-winding of the motor.

Secured to the bottom side of the cross-beam 53 are the trolley rail or wire supporting hangers 143, which support the wires 20 and 21 at their proper gage or distance apart, and said beams, together with their trolley rail or wire supporting hangers 143, are arranged at suitable intervals apart to securely sustain the trolley rails or wires 20 and 21. At each of the stations or places where mail is received from the carriage and delivered thereto I provide a horizontally-extending hook 144, which is secured to the inner end of the latch trip-bar 145. The latch trip-bar 145 has formed on its inner end the upwardly-extending slide-bar 146, which is adapted to slide in the vertically-depending guides 147, which latter guides have their upper ends secured to the sides of the cross-beam 52 in position thereon, so that the horizontally-extending hook 144 will be in a plane to be moved into position to engage the eye 148, formed in the neck 149 of the mail-sack 150.

One of the ends of the rope 151 is passed over and around the spool 152, pivotally mounted on the pin 153, secured between the ways of the guide 147 and situated near the top end thereof, thence through the eye of the lug 154, formed integral on the slide-bar 146, thence to and through the eye of the lug 155, formed integral on the lower end and of the latch 159, wherein it is fastened or prevented from pulling through, as by a knot 151$^a$. The other slack end of the rope 151 extends loosely downwardly to and through the guiding-eye 160, formed integral on the bottom end of the bar 145, and after allowing a sufficient length of rope to extend within easy access of the operator this end is also made fast to the eye of the lug 155, as by a knot 151$^b$. The guiding-eye 160 prevents the rope 151 becoming entangled in the vicinity of the latch 159. The latch 159 is pivoted on the pin 161, secured to project from the face of the bar 146, and is provided with the catch 162, adapted to engage the eye or catch-opening 163, formed in one of the jaws of the ways 147. To the back of the latch 159 is situated a stop-pin 156, which latter prevents the latch 159 being swung too far out of position backwardly from the catch-opening or eye 163 and out of position to prevent the catch 162 readily engaging its eye 163. Now when it is necessary to move the latch out of engagement to permit the lowering of the mail-sack hook 144 that portion of the rope 151 depending from the eye 155 is drawn taut to move or swing the latch 159 out of the position shown in Fig. 8 to that shown in Fig. 7, which shows the catch disengaged.

Figures 1, 2, 7, 8, 9, 10:
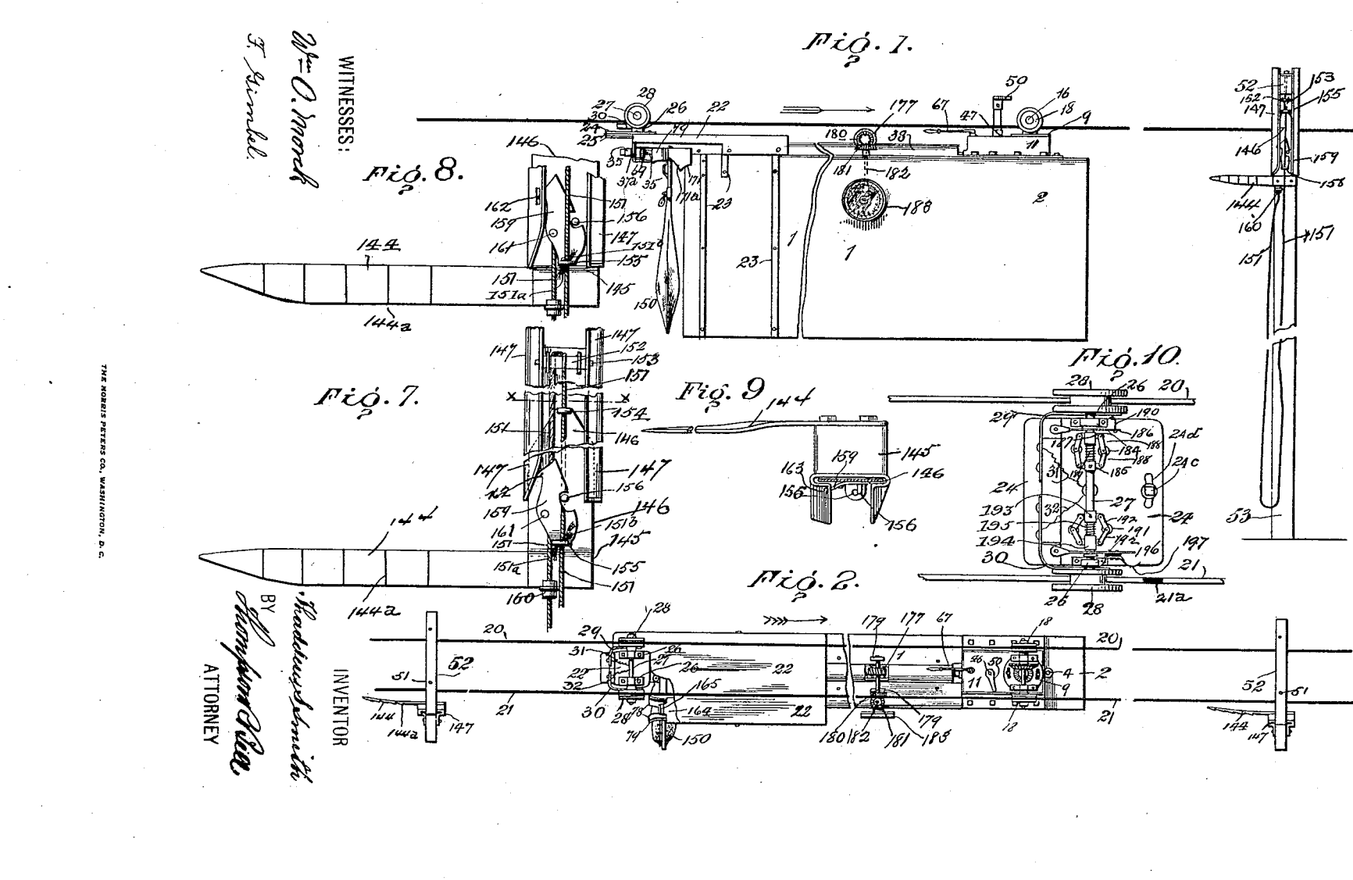
Figure 1 is a broken longitudinal elevation of my invention of an electrically-propelled carriage or vehicle for carrying and delivering rural mail and also showing the trolley wire or rails from which the carriage is suspended.
Fig. 2 is a plan view of the same.
Fig. 7 is an enlarged detail broken view of the mail-sack-receiving hook, which view shows the retaining-latch whereby said hook is held in position in its guideways about to engage the eye or catch formed in one of the ways.
Fig. 8 is a similar detail broken view showing said latch in engagement with said eye or catch.
Fig. 9 is a broken top view of the same, taken through the line X X. (See Fig. 7.)
Fig. 10 is a detail plan view of the rear trolley-table, showing the means for governing or controlling the speed of the carriage or vehicle.
Figures 3, 3A, 5:
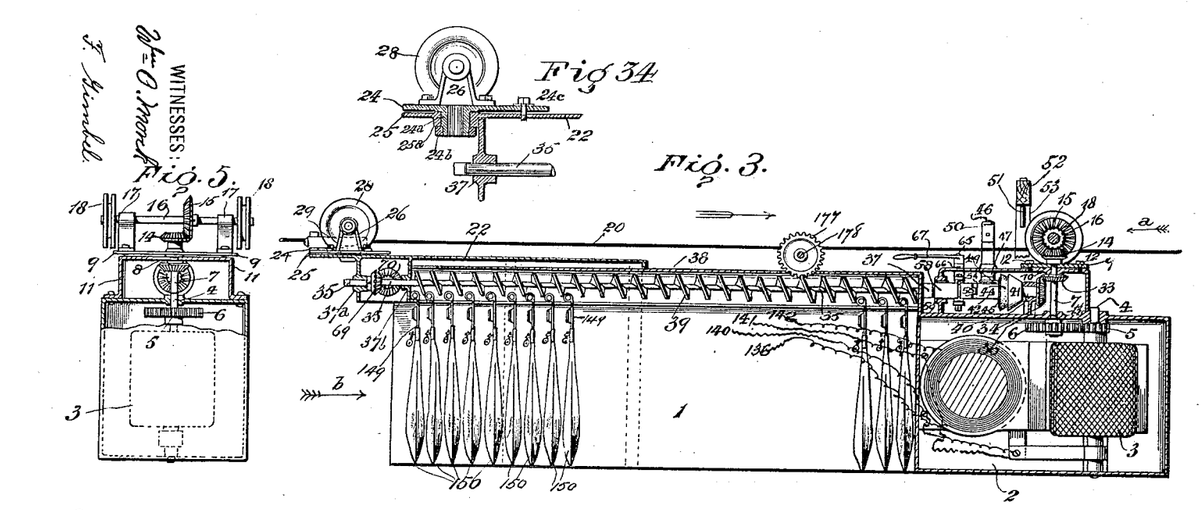
Fig. 3 is an enlarged longitudinal sectional elevation of said carriage, taken through the line A B. (See Fig. 4.)
Fig. 5 is an end elevational view of said carriage or vehicle looking in the direction of the arrow *a*. (See Figs. 3 and 4.)

On looking directly at the latch, as shown in Fig. 7, that portion of the rope depending from the eye of the lug 155 when drawn tautly will of course move the latch 159 into the position shown in this figure, for the reason that the eye of the lug 155 is situated to the right side of the pivotal pin 161. Now when raising the bar 145 and its hook 144 into its upper position in the guideways 147 the other end of the rope 151 not engaged or in any way connected to the latch 159, but passing through the eye 160, will draw its opposite end up tautly and pull the latch in the opposite direction—that is, upwardly—to cause the latch to swing out of contact with the stop-pin 156 and move the catch 162 thereof into engagement with the opening or eye 163. Now when the reduced top portion of the neck 149 of the mail-sack adjacent to the T-head 80 is situated between the supporting-ways 79 with said T-head resting on said guideways in position to be removed therefrom means must be employed to retain said T-head 80 in this position till such time as the hook 144 engages the eye 148 or till the top reduced portion of the neck 149 adjacent to the T-head 80 be engaged by the catch 83 of the discharging-lever 77. For this purpose I provide the retaining-latch 164, having the retaining-catch 165 formed thereon and adapted to engage the T-head 80 to retain the same in position between the ways 79. The latch 164 is provided with the hinge or eye 166, which eye fits or pivots on the pivotal pin 167, which pin passes through the extended portion of the flaring sides of the scoop 78 and also the lug 168, to be supported thereby.

A stop 169, formed integral on the extended portion of the flaring sides 78, extends outwardly over the cam-shoulder 170, so that when the cam 171 is brought suddenly into contact with the bar 145 of the hook 144 the said cam will be prevented from swinging too far in an upwardly direction to unduly strain the latch-retaining spring 172.

The hook 144 on its outer sides is provided with notches 144ª, which are adapted to engage the shoulder 148ª, formed integral on the rear side of the neck 149 to prevent the mail-sack 150 when engaged by the hook 144 springing from engagement with the hook, which occurrence is liable to happen, owing to the inertia due to the velocity of the mail-carriage and the reaction or spring after engagement due to the inertia of the mail-sack.

The shoulder 148ª is yieldingly held in engagement with the notches 144ª by means of the spring-latch 173, which is hinged on the rear side of the neck 149 of the mail-sack 150 and adapted to yieldingly press against the side of the hook 144 directly opposite the shoulder 148ª by a suitable coil-spring 174.

Figures 31, 32:
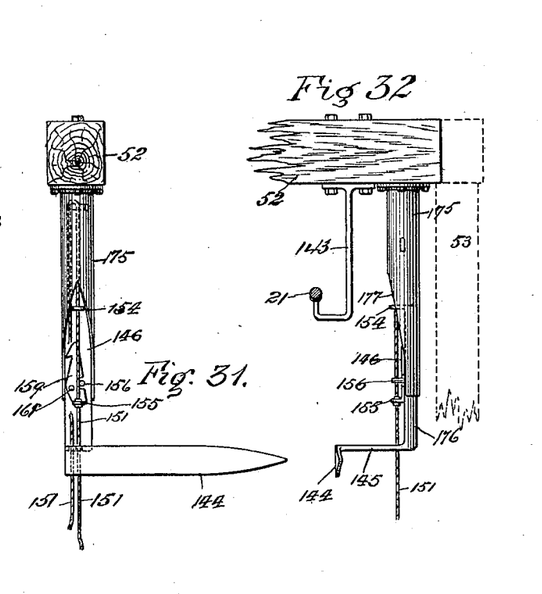
Fig. 31 is an enlarged detail broken view of the mail-sack-receiving hook, similar to the hook illustrated in Fig. 7 and showing a tubular guideway instead of the rectangular guideway illustrated in Figs. 7, 8, and 9.
Fig. 32 is a side view of the same.
Figure 33:
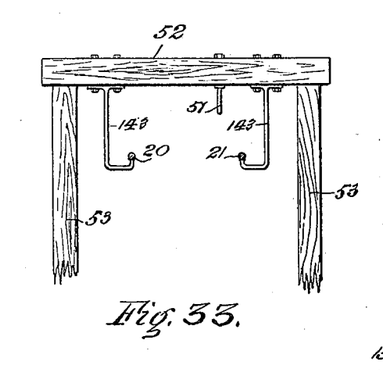
Fig. 33 is an end elevation of the cross-beam and supporting-poles, whereby the track or trolley wires are supported.

A depending tubular guide 175, as illustrated in Figs. 31 and 32, may be substituted for the guideways 147, in which case a semicircular bar or one-half tube 176 is fitted into the tube 175 to telescope therein. The end of the tube 175 is cut longitudinally and slantingly or diagonally to form a longitudinal opening larger at the bottom and gradually tapering upwardly and diminishing in width, so that when the side bar 176 is telescoped into said tube 175 till the bar 145 enters said longitudinal opening, the tapering sides of the latter will bear against the sides of said bar 145 in its upward movement to direct and guide the bar 176 and the parts connected thereto, and when said bar 176 is moved into its extreme top position the hook 144 will be maintained in its true position to catch the mail-sacks as they approach the latter.

In order to ascertain the position of a mail-sack in the magazine 1 and the order in which the mail-sacks are to be placed therein, I provide a counting and indicating mechanism. (Illustrated more particularly in Figs. 1, 2, 3, and 4.)

A worm-wheel 177 is engaged and revolved by the magazine-screw 39 with which it meshes, said worm-wheel being secured on the arbor 178 to turn therewith. The arbor 178 is journaled in the standards 179, resting on and secured to the top or roof of the magazine 1. On the end of the arbor 178 is keyed the bevel-gear 180, which meshes with the bevel-gear 181, secured on the vertical shaft 182, which shaft is connected in any suitable way to the indicator mechanism of the indicator 183, the dial and case of which is secured to the exterior side of the magazine 1, so that when the shaft 35 is revolved each revolution will be recorded by means of the indicator 183 and the number of sacks remaining within the magazine, as well as the number discharged therefrom can be readily read from said indicator and counter.

Figures 12, 13:
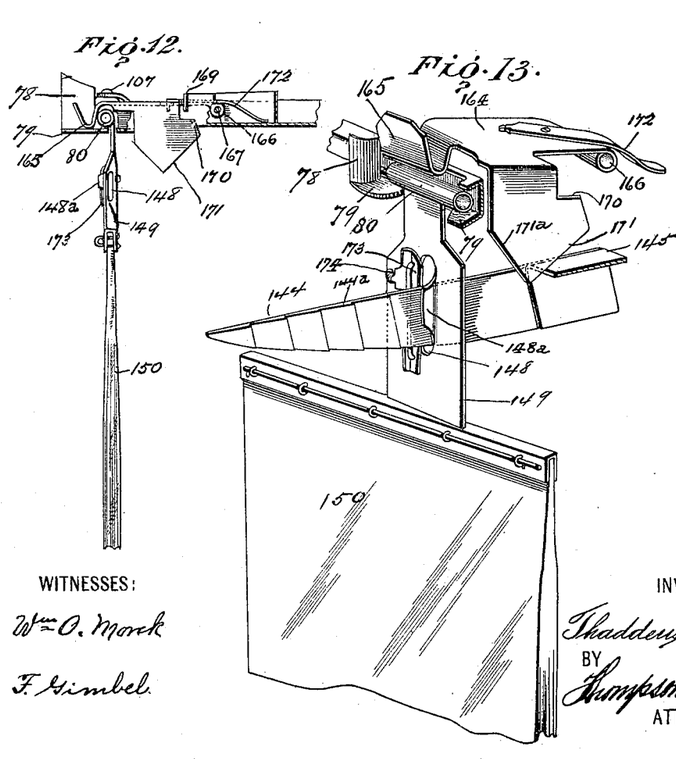
Fig. 12 is an enlarged detail side view of a mail-sack and a sectional broken view of the receiving-scoop for conducting the mail-sacks to the ways leading to the magazine in section and also the sack-retaining latch.
Fig. 13 is a similar broken perspective view.
Figure 14:
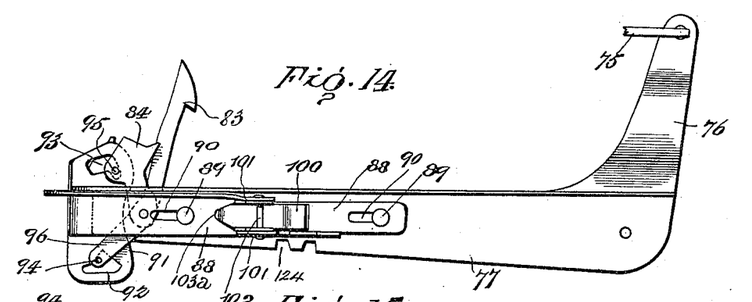
Fig. 14 is an enlarged detail plan view of the swinging lever, whereby the mail-sacks are moved along the ways or guides connecting the magazine-guide and receiving scoop or conductor.

A clearer conception of the application of this invention will be obtained from the following description: Suppose the carriage conveying the mail to be traveling in the direction of the arrow indicated in Figs. 1, 2, 3, 4, and 21—that is, in a direction to deliver mail at stations along the route of the mail-conveying carriage—and suppose also the carriage to be approaching a station at which there is located a mail-sack-receiving hook 144. The carriage in its passage past the post 53 to which the mail-sack-receiving hook 144 is attached, causes the trip-lever 50 to forcibly contact the trip-pin 51 to throw or swing the trip-lever 50, which movement of the lever, as previously described, moves the clutch 44 into engagement with the clutch 41 to cause a single rotation of the shaft 35, to revolve it in a left-hand direction, and its magazine-screw 39, secured or formed integral thereon, and by reason of the peculiar construction of the clutch mechanism, previously described, said shaft 35 will make one single revolution only, thus traversing the mail-sack 150 into position in the ways 81 to be engaged by the catch 83 of the discharge-lever 77, and as other mail-sacks are required those stored in the magazine 1 are moved in their order along the ways 82 toward the discharge-ways 81, so that when one sack is delivered the next following is moved into position to be delivered at the next following delivering place or station. Simultaneously with the movement of the mail-sack 150 into position in the ways 81 the catch 83 of the discharging-lever 77 engages the top reduced portion of the neck 149 of said mail-sack to move the T-head 80 therein along said ways 81 into position upon the ledges 79 (see more particularly Figs. 12 and 13) to be discharged therefrom. When the mail-sack arrives in position to be engaged by the mail-sack hook 144, the latter engages the eye 148 of the neck 149, as shown in Fig. 13, simultaneously with which movement the bar 145 contacts the cam 171 to raise the latch 164 and its catch 165 to release the latter from the T-head 80, thereby permitting the said T-head to be slid outwardly off the ledges 79 of the chute, and when the cam 171 first passes the bar 145 said latch 164 and its catch 165 drops down into its normal position to retain the next mail-sack moved in its order to be discharged, and thus the mail-sacks are delivered along the route at their respective stations in their regular order of rotation.

I will now describe the operating of the carriage on a return-trip, in which case the reverse operation is performed—that is to say, the mail-sacks 150 are removed from the hook 144 and received by the carriage to be returned to the terminal station, which operation I will now proceed to describe.

Figure 11:
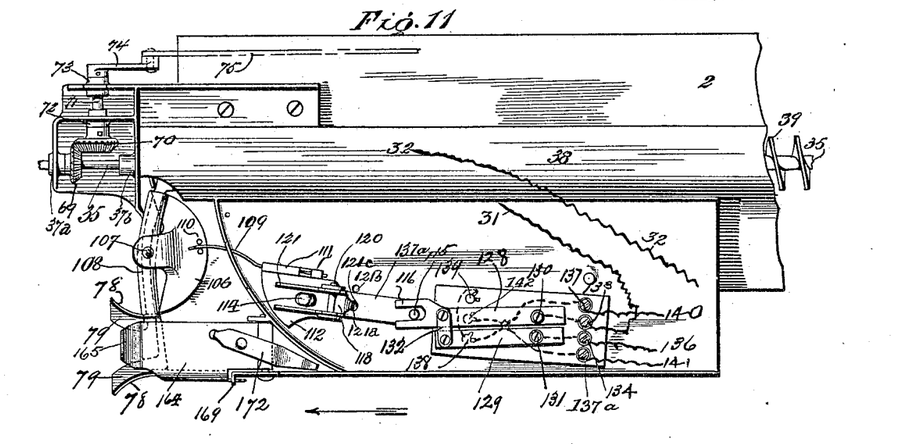
Fig. 11 is an enlarged broken-off plan view of the mail-sack-receiving end of the carriage or vehicle.

Suppose the carriage set to move in the direction of the arrow indicated in Figs. 11 and 22, which is the direction opposed to that indicated in Figs. 1, 2, 3, 4, and 21, which Fig. 22 shows the position of the pole-changer and all the other parts, as the cam 106 and the shifting leg 88, which relative positions of all said parts correspond to a backward movement of the mail carriage or vehicle. The position of the shifting leg 88 corresponds with the position as indicated in Figs. 17, 18, and 20, in which the catch 83 is moved from and out of the position indicated in Figs. 14, 15, and 19 to pass the reduced portion of the neck 149 of the mail-sack without engaging the latter, and the pushing-dog 84 is moved into position to engage the top reduced portion 149 of the mail-sack to push the T-head 80 of the latter into and along the ways 81 to and into the ways 82 to be engaged by the magazine-screw 39. Now when the carriage backs up to a station the side 171ª of the cam 171 first contacts with the bar 105 and raises the catch 165 to leave the ledges 79 free and unobstructed to permit them to pass under the T-head 80 and when the cam 171ª has passed out of contact with the bar 145 the catch 165 drops over the outer unguarded side of the T-head 80 to retain the same in position on the ledges 79 and in the chute. At this instant the discharge-lever 77 moves outwardly and the dog 84 contacts with the outer off side of the reduced portion of the neck 149 of the mail-sack when said lever 77 has reached its extreme outward movement, and on the return movement of said lever 77 the dog 84 contacts the outer edge of the reduced portion of the neck 149 to push the T-head 80 along the ways 81 into position into the end of the ways 82 to be engaged by the magazine-screw 39 to be traversed along the ways 82 into the interior of the magazine 1 under cover.

Figure 30:
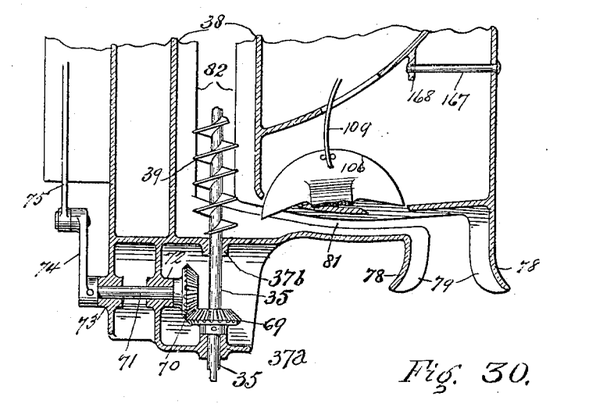
Fig. 30, Sheet 3, is a detail sectional plan view of the magazine conducting-ways, taken through the line K L. (See Fig. 6.)

It will be particularly noted in Fig. 30 the cam 106 is set and yieldingly maintained in position by the spring 109, as previously described for this latter movement, and when the T-head has entered into its position in the ways 82 to be traversed by the screw 39 a backward movement of the T-head 80 is prevented by the cam 106, the inner end of which is in the position shown in Fig. 30 to contact the end of said T-head when the carriage is running in a backwardly direction.

Figure 4:
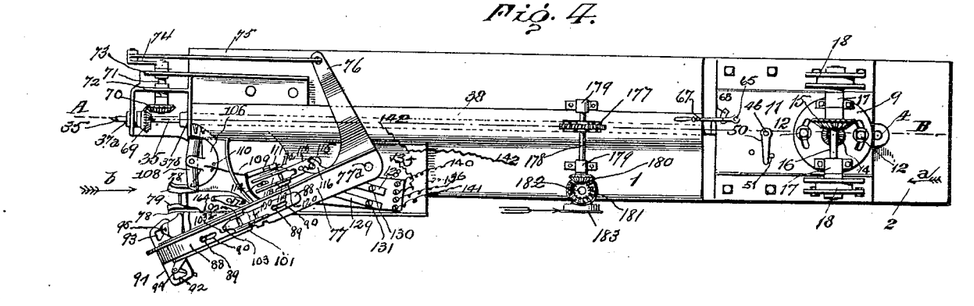
Fig. 4 is a plan view of the same, showing the lever and switch cover and end trolley-carrying pivotal table removed.
Figure 6:
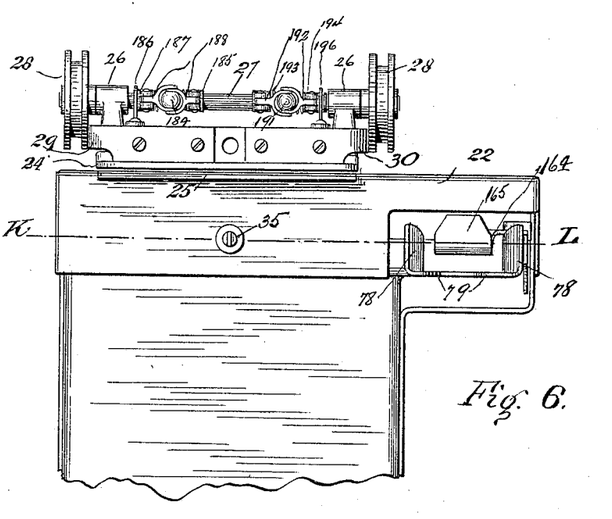
Fig. 6 is an enlarged broken end elevation of said carriage or vehicle looking in the direction of the arrow *b*. (See also Figs. 3 and 4.)

It will be observed that when the carriage is running in a forward direction the cam 106 is in the position indicated in Figs. 4 and 21— that is, in position to retain the T-head 80 of the mail-sack in position on the ledges 79 to be delivered to the hook 144 and to prevent its backward movement into the ways 81. Now since the motor in going downgrade would be liable to attain excessive velocity means must be provided whereby a constant speed of the vehicle be maintained. For this purpose I provide a centrifugal governing means which comprises the centrifugal weights 184, hingedly connected to the toggle-arms 188, which arms have their other ends hingedly connected to the sleeves 185 and 187. The sleeve 185 is secured on the axle 27 to turn therewith, and the sleeve 187 is mounted on said axle to turn therewith and slide longitudinally thereon. A coil-spring 189 surrounds the axle 27 between the sleeves 185 and 187, so that when the centrifugal force of the weights 184 is diminished the spring will cause the sleeve 187 to move along the axle 27 from the sleeve 185. The sleeve 187 is provided with the groove adapted to receive the hinged arm 186. The hinged arm 186 is hinged at one end to the pivotal table 24 and at its other free end is connected to the end of the brush 29 by a hook 190, so that when the velocity of the carriage is diminished the sleeve 187 will move toward the arm 186, thereby releasing the brush 29 to permit it to contact with the trolley-wheel 28 making or completing the circuit. It will be readily seen that when the velocity of the carriage or vehicle is increased beyond the normal the centrifugal force of the governor-weights 184 will operate to move the sleeve 187 to cause the brush 29 to disengage from the trolley-wheel 28, thereby breaking the circuit and momentarily shutting off the current from and reducing the speed of the motor propelling the vehicle.

In order to ascertain the position of the carriage at either terminal of the route, I provide a means of insulating short sections of one of the trolley wires or conductors, as 21, and situate these insulators at each of the stations, so that when the trolley 28 touches an insulated portion 21ª of the wire 21 the circuit will be broken, and a suitable instrument at either terminal will indicate the order and time of a breaking of the circuit, and each break will occur in this regular order of the stations, thereby designating and recording each of the stations as they are passed. Now suppose the carriage reaches an insulated portion, as 21ª, of the wire 21 and stops there. Then if some provision were not made said carriage would remain fixed or stationary in such position. Now to avoid a stop of this kind I provide a centrifugal governing mechanism similar to that previously described, whereby the circuit is made.

The centrifugal weights 191 are hingedly connected to the governor-arms 192 at one end, and said arms have their opposite ends hingedly connected to the sleeves 193 and 194. The sleeve 193 is secured on the axle 27 to turn therewith, and the sleeve 194 is adapted to slide on and turn with said axle. A coil-spring 195, surrounding the axle 27, is situated between the sleeves 193 and 194. The sleeve 194 is grooved to receive the arm 196, one end of which is hinged to the table 24, and to the other end is secured a contacting bridge-spring 197. Now when the vehicle comes to a standstill the axle 27 of course will cease to revolve, and the sleeve 194 will be moved by the coil-spring 195 away from the sleeve 193, thereby moving the end of the arm 196 toward the trolley wire or rail 21 to cause the contacting bridge-spring 197 to contact and to bridge over the insulated portion 21ª of the wire 21, thereby completing the circuit and starting the motor to drive the carriage or vehicle on its onward direction.

Having thus fully described this my invention, what I claim as new and useful, and desire to cover by Letters Patent of the United States therefor, is—

1. In a mail-conveying means, the combination with a pair of conducting-rails, a carriage suspended from said conducting-rails comprising a motor-compartment and a mail-sack-magazine compartment, ways extending longitudinally within said magazine-compartment for supporting the mail-sacks in the order of their delivery, a discharging-chute situated at one side and to the rear of said vehicle, a conducting-way extending from said magazine-way to said discharging-chute, an intermittently-operating magazine-screw extending longitudinally of said magazine-compartment directly over said magazine-ways, means for traversing the mail-sacks along said conducting-way from said magazine-ways to said discharging-chute one by one as they are passed to said conducting-way, and means situated at each station for receiving the mail-sacks from the discharge-chute.

2. In a mail-conveying means, the combination with a pair of conducting-rails, a carriage suspended from said conducting-rails comprising a motor-compartment and a mail-sack-magazine compartment, of means for supporting the mail-sacks within said magazine-compartment in the order of their delivery, a discharging-chute situated at one side and to the rear of said vehicle, a conducting-way extending from said magazine-supporting means to said discharging-chute, an intermittently-operated magazine-screw extending longitudinally of said magazine-compartment and situated directly over said mail-sack-supporting means, a swinging mail-sack-discharging lever, a mail-sack-engaging dog carried by said lever, mechanism for operating said lever simultaneously with the intermittent rotations of said magazine-screw whereby the mail-sack is engaged at the proper time to be delivered to the discharging-chute, and means situated at each station for receiving the mail-sacks from the discharge-chute.

3. In a mail-conveying means, the combination with a pair of conducting-rails, a carriage suspended from said conducting-rails, comprising a motor-compartment and a mail-sack-magazine compartment, means for supporting the mail-sacks within said magazine-compartment in the order of their delivery, a discharging-chute situated at one side and to the rear of said vehicle, a conducting-way extending from said magazine-supporting means to said discharging-chute, an intermittently-operated magazine-screw extending longitudinally of said magazine-compartment and situated directly over said magazine-ways, a clutch-driving connection situated at one end of said magazine-screw, a one-toothed retaining clutch-sleeve whereby the members of said driving-clutch are operated to be engaged during one revolution of said magazine-screw to discharge only one mail-sack at a time, a clutch trip-lever, and means situated at each of the stations for operating or tripping said lever, of means for traversing the mail-sacks along said conducting-way from said magazine-ways to said discharge-chute one by one as they are passed to said conducting-way, and means situated at each station for receiving the mail-sacks from the discharge-chute.

4. In a mail-conveying means, the combination with a pair of conducting-rails, a carriage suspended from said conducting-rails, comprising a motor-compartment and a mail-sack-magazine compartment, means for supporting the mail-sacks within said magazine-compartment in the order of their delivery, a discharging-chute situated at one side and to the rear of said vehicle, a conducting-way extending from said magazine-supporting means to said discharging-chute, an intermittently-operated magazine-screw extending longitudinally of said magazine-compartment and situated directly over said magazine-ways, a clutch-driving connection situated at one end of said magazine-screw, a one-toothed retaining clutch-sleeve whereby the members of said driving-clutch are operated to be engaged during one revolution of said magazine-screw to discharge only one mail-sack at a time, a clutch trip-lever, and means situated at each of the stations for operating or tripping said lever, of a swinging discharging-lever, a mail-sack-engaging dog carried by said lever, mechanism for operating said lever simultaneously with the intermittent rotations of said magazine-screw whereby the mail-sack is engaged at the proper time to be traversed along said conducting-way to be delivered to the discharging-chute, and means situated at each station for receiving the mail-sacks from the discharge-chute.

5. In a mail-conveying means, the combination with a pair of conducting-rails, a carriage suspended from said conducting-rails, comprising a motor-compartment and a mail-sack-magazine compartment, means for supporting the mail-sacks within said magazine-compartment in the order of their delivery, a discharging-chute situated at one side and to the rear of said vehicle, a mail-sack-retaining latch situated in said chute, means for operating said retaining-latch to release the mail-sacks, a conducting-way extending from said magazine-supporting means to said discharging-chute, an intermittently-operated magazine-screw extending longitudinally of said magazine-compartment and situated directly over said magazine-ways, a clutch-driving connection situated at one end of said magazine-screw, a one-toothed retaining clutch-sleeve whereby the members of said driving-clutch are operated to be engaged during one revolution of said magazine-screw to discharge only one mail-sack at a time, a clutch trip-lever, and means situated at each of the stations for operating or tripping said lever, of a swinging discharge-lever, a mail-sack-engaging dog carried by said lever, mechanism for operating said lever simultaneously with the intermittent rotations of said magazine-screw whereby the mail-sack is engaged at the proper time to be traversed along said conducting-way to be delivered to the discharging-chute, and means situated at each station for receiving the mail-sacks from the discharge-chute.

6. In a mail-conveying means, the combination with a pair of conducting-rails, a carriage suspended from said conducting-rails, comprising a motor-compartment and a mail-sack-magazine compartment, means for supporting the mail-sacks within said magazine-compartment in the order of their delivery, a discharging-chute situated at one side and to the rear of said vehicle, a mail-sack-retaining latch situated in said chute, a retaining-latch cam, a conducting-way extending from said magazine-supporting means to said discharging-chute, an intermittently-operated magazine-screw extending longitudinally of said magazine-compartment and situated directly over said magazine-way, a clutch-driving connection situated at one end of said magazine-screw, a one-toothed retaining clutch-sleeve whereby the members of said driving-clutch are operated to be engaged during one revolution of said magazine-screw to discharge only one mail-sack at a time, a clutch trip-lever, and means situated at each of the stations for operating or tripping said lever, of a swinging discharging-lever, a mail-sack-engaging dog carried by said lever, a crank connected to the rear end of said screw, means connecting said crank to said swinging discharging-lever to intermittently operate the latter simultaneously with the motion of said screw, a mail-sack-receiving hook, and a bar connected to said receiving-hook in a plane situated relatively to said receiving-hook to engage said latch-cam when said hook is in position to engage a mail-sack.

7. In a mail-conveying means, the combination with a pair of conducting-rails, a carriage suspended from said conducting-rails, an electric motor connected to said carriage, means for supporting the mail-sacks within said carriage in the order of their delivery, a discharging-chute situated at one side and to the rear of said vehicle, a mail-sack-retaining latch situated in said chute, a retaining-latch cam, a conducting-way extending from said mail-sack-supporting means to said discharge-chute, a mail-sack-retaining cam adapted to close said conducting-way to lock the mail-sack in position, an intermittently-operated magazine-screw extending longitudinally of said carriage and situated directly over said mail-sack-supporting means, a clutch-driving connection situated at one end of said magazine-screw, a one-toothed retaining clutch-sleeve whereby the members of said driving-clutch are operated to be engaged during one revolution of said magazine-screw to discharge only one mail-sack at a time, a clutch trip-lever, means situated at each of the stations for operating or tripping said lever, of a swinging discharging-lever, a mail-sack-engaging dog carried by said lever, a crank connected to the rear end of said screw, means connecting said crank to said swinging discharging-lever to intermittently operate the latter simultaneously with the motion of said screw, a mail-sack-receiving hook, a bar connected to said receiving-hook in a plane situated relatively to said receiving-hook to engage said latch-cam when said hook is in position to engage a mail-sack.

8. In a mail-conveying means, the combination with a pair of conducting-rails, a mail-conveying carriage comprising a motor-compartment and a mail-sack-magazine compartment, trolleys mounted on said rails, fore-and-aft tables pivotally connected to said carriage and suspension journal-bearings connecting said trolleys and said pivotal tables, of an electrically-operated motor situated in the motor-compartment of said carriage, power-transmitting means connecting one of said trolleys and said electrical motor for propelling the vehicle in either a forwardly or a backwardly direction, ways situated within said magazine for supporting the mail-sacks in the order of their delivery, a receiving and discharging chute, a conducting-way connecting said receiving and discharging chute with said mail-sack-supporting ways, means for traversing said mail-sacks along said conducting-way to and from said receiving and discharging chute and means situated at each station for causing the receiving and discharging mechanism to be connected with the driving means of the vehicle to operate to either receive or discharge the mail as the carriage is moved in either a forwardly of a backwardly direction.

9. In a mail conveying and distributing means, the combination with a pair of conducting-rails, a mail-carriage having carriage-supporting trolleys mounted on said rails, tables situated fore and aft of said carriage pivotally connected thereto, and suspension journal-bearings extending from said trolleys to be secured to said tables, of an electrically-propelled motor attached to said carriage, suitable brushes contacting one of the trolleys on each of said rails, conducting feed-wires extending from said brushes to said motor, a pole-changer situated between the said motor and said brushes, a mail-sack receiving and discharging chute, means for supporting the mail-sacks within said carriage, a conducting-way connecting said discharging and receiving chute to said mail-sack-supporting means, a swinging lever, pushing and pulling dogs on said swinging lever situated to engage said mail-sacks to remove them to and from said chute, a mail-sack traversing screw situated within said carriage adjacent the mail-sack-supporting means, and means for setting said dogs to operate to either move the mail-sacks into or out of said carriage while being received or discharged therefrom.

10. In a mail conveying and distributing means, the combination with a pair of conducting-rails, a mail-carriage having carriage-supporting trolleys mounted on said rails, tables situated fore and aft of said carriage and pivotally connected thereto, and suspension journal-bearings extending from said trolleys to be secured to said tables, of an electrically-propelled motor attached to said carriage, suitable brushes contacting one of the trolleys of each of said rails, conducting feed-wires extending from said brushes to said motor, a pole-changer situated between said motor and said brushes, a mail-sack receiving and discharging chute, means for supporting the mail-sacks within said carriage, a conductor connecting said mail-sack receiving and discharging chute to said mail-sack-supporting means, a swinging lever, pushing and pulling dogs on said swinging lever situated to engage said mail-sacks to remove them to and from said chute, a magazine-mail-sack traversing screw situated within said carriage adjacent the mail-sack-supporting means, a mail-sack-retaining cam adapted to close said conducting-way to lock the mail-sack in either of two positions, a switch situated between said pole-changer and said mail-sack-retaining cam and means adapted to be applied to said switch for operating to simultaneously operate the pole-changer and reverse the mail-sack-retaining cam and the dogs of said receiving and discharging lever to conform with either the forward or backward motion of said mail-conveying carriage.

11. In a mail conveying and distributing means, the combination with a pair of conducting-rails, a carriage suspended from said conducting-rails, an electrical propelling means attached to said carriage, means connecting said propelling means with said conducting-rails, means for discharging and means situated at the delivering-station for receiving the mail from said mail-conveying carriage, of an intermittently-operated clutch connecting said mail-discharging means and said motor for operating said discharging means, and a registering means connected to said discharging means.

12. In a mail conveying and distributing means, the combination with a pair of conducting-rails, a carriage suspended from said conducting-rails comprising a motor-compartment and a mail-sack-magazine compartment, ways extending longitudinally within said magazine-compartment for supporting the mail-sacks in the order of their delivery, a discharging-chute situated at one side and to the rear of said vehicle, a conducting-way extending from said magazine-ways to said discharge-chute, an intermittently-operated magazine-screw extending longitudinally of said magazine-compartment directly over said magazine-ways, means for traversing the mail-sacks along said conducting-way from said magazine-ways to said discharge-chute one by one as they are passed to said conducting-way, means for receiving said mail-sacks from the discharge-chute, and a registering and indicating mechanism operatively connected to said magazine-screw whereby the number of sacks discharged is registered.

13. In a mail conveying and distributing means, the combination with a pair of conducting-rails, a carriage suspended from said conducting-rails, comprising a motor-compartment and a mail-sack-magazine compartment, ways situated within said magazine for supporting the mail-sacks, in the order of their delivery, a magazine-mail-sack traversing screw extending longitudinally of said compartment situated over said ways, a discharging-chute, a conducting-way connecting said magazine-ways to said discharging-chute, means for traversing said mail-sacks along said conducting-way to and from said discharging-chute, a retaining clutch-sleeve slidably mounted on one end of said magazine-screw and provided with a single engaging tooth, a clutch-sleeve provided with a recess adapted to engage said clutch-tooth and means for moving said retaining-sleeve out of engagement with said clutch-sleeve to permit said magazine-screw and the receiving and discharging means of said carriage to be operated manually.

In testimony whereof I affix my signature in presence of two witnesses.

THADDEUS S. SMITH.

Witnesses:
 THOMPSON R. BELL,
 FLORENCE GIMBEL.